US012723896B2

(12) United States Patent
Saito et al.

(10) Patent No.: US 12,723,896 B2
(45) Date of Patent: Sep. 1, 2026

(54) ABSOLUTE ENCODER

(71) Applicant: MINEBEA MITSUMI Inc., Nagano (JP)

(72) Inventors: Katsunori Saito, Nagano (JP); Hiroki Negishi, Nagano (JP); Takeshi Sakieda, Nagano (JP)

(73) Assignee: MINEBEA MITSUMI INC., Nagano (JP)

( * ) Notice: Subject to any disclaimer, the term of this patent is extended or adjusted under 35 U.S.C. 154(b) by 274 days.

(21) Appl. No.: 18/551,970

(22) PCT Filed: Mar. 11, 2022

(86) PCT No.: PCT/JP2022/010843
§ 371 (c)(1),
(2) Date: Sep. 22, 2023

(87) PCT Pub. No.: WO2022/209747
PCT Pub. Date: Oct. 6, 2022

(65) Prior Publication Data

US 2024/0175670 A1 May 30, 2024

(30) Foreign Application Priority Data

Mar. 31, 2021 (JP) ................................ 2021-062047

(51) Int. Cl.
*G01D 5/249* (2006.01)
*G01B 7/30* (2006.01)
(Continued)

(52) U.S. Cl.
CPC ............. *G01D 5/2497* (2013.01); *G01D 5/04* (2013.01); *G01B 7/30* (2013.01); *G01D 3/08* (2013.01); *G01D 5/28* (2013.01); *G01D 2205/26* (2021.05)

(58) Field of Classification Search
CPC .......... G01D 5/14; G01D 5/145; G01D 5/244; G01D 5/24433; G01D 5/2497;
(Continued)

(56) References Cited

U.S. PATENT DOCUMENTS 6,120,104 A * 9/2000 Okamoto .............. G09F 21/045 40/587
2009/0123098 A1 * 5/2009 Takahashi ............... G01P 3/487 384/448

(Continued)

FOREIGN PATENT DOCUMENTS

EP 2 159 547 A2 3/2010
JP 2008-267868 A 11/2008
(Continued)

OTHER PUBLICATIONS

Machine translation of WO 2020/203467 (Year: 2020).*
(Continued)

*Primary Examiner* — Steven L Yeninas
(74) *Attorney, Agent, or Firm* — Chrisman Gallo Tochtrop LLC

(57) ABSTRACT

To improve the detection accuracy of a rotation angle of a rotation shaft caused by the magnetic flux distribution of a magnet. In an absolute encoder, a support shaft has one end fixed to a gear base part as a substrate, and includes a flange part at the other end. A first bearing and a second bearing as at least one bearing include inner rings fixed to the support shaft. The first bearing and the second bearing are disposed between the gear base part and the flange part in an axial direction. A spacer is disposed between the first bearing and the second bearing, and a magnet (Mq), in the axial direction of the support shaft. The spacer is in contact with outer rings of the first bearing and the second bearing from the axial direction inside a bearing fixing part.

4 Claims, 11 Drawing Sheets

(51) Int. Cl.
*G01D 3/08* (2006.01)
*G01D 5/04* (2006.01)
*G01D 5/28* (2006.01)

(58) Field of Classification Search
CPC ........... G01D 5/34738; G01D 2205/26; G01D 2205/28; G01D 2205/40; G01D 3/08
See application file for complete search history.

(56) References Cited

U.S. PATENT DOCUMENTS

2009/0243600 A1* 10/2009 Itomi ...................... G01P 3/487 324/207.25
2009/0263061 A1* 10/2009 Takahashi ............... G01P 3/487 384/446
2010/0052663 A1 3/2010 Mehnert et al.
2011/0137609 A1* 6/2011 Itomi ..................... G01D 5/145 324/207.25
2012/0146630 A1* 6/2012 Itomi ..................... G01D 5/145 324/207.25
2014/0077922 A1* 3/2014 Horiguchi ............ H01C 10/103 338/12
2016/0265942 A1* 9/2016 Kawamura .......... G01D 3/0365
2017/0363444 A1* 12/2017 Kawamura ........ G01D 5/24485
2018/0342926 A1* 11/2018 Inuzuka ............... H01R 13/405
2019/0047161 A1* 2/2019 Noda ................... A61H 1/0274
2019/0277668 A1* 9/2019 Osada ....................... H02P 6/16
2020/0217254 A1 7/2020 Kono et al.
2022/0196380 A1 6/2022 Saito et al.

FOREIGN PATENT DOCUMENTS

JP 2020-112179 A 7/2020
WO 2020/053992 A2 3/2020
WO 2020/203467 A1 10/2020

OTHER PUBLICATIONS

International Search Report for corresponding International Application No. PCT/JP2022/010843 mailed Apr. 26, 2022.
Written Opinion for corresponding International Application No. PCT/JP2022/010843 dated Apr. 26, 2022.
Extended European Search Report dated Feb. 25, 2025 for corresponding European Application No. 22779968.1.
First Office Action in the corresponding CN application No. 202280018292.4 Mar. 23, 2026.

* cited by examiner

ABSOLUTE ENCODER

CROSS-REFERENCE TO RELATED APPLICATIONS

This application is a national stage entry of International Application No. PCT/JP2022/010843 filed on Mar. 11, 2022, which claims the benefit of priority to Japanese Application No. JP2021-062047, filed Mar. 31, 2021, the entire disclosures of which are hereby incorporated herein by reference.

TECHNICAL FIELD

The present invention relates to an absolute encoder.

BACKGROUND ART

Conventionally, in various types of control mechanical apparatuses, as a rotary encoder used for detecting the position and the angle of a movable element, an absolute encoder of an absolute type detecting an absolute position or angle (hereinafter referred to as "absolute encoder") has been known.

Some absolute encoders measure the amount of rotation of a main shaft based on the rotation angle of a sub-shaft. Such absolute encoders detect the rotation angle of the sub-shaft based on a change in the magnetic field of a magnet attached at the sub-shaft or to a distal end of a rotating body such as a gear attached at the sub-shaft. The change in the magnetic field is detected by an angle sensor provided opposite to the magnet. The detection accuracy of the angle sensor increases as the influence of the magnetic flux other than the magnetic flux from the magnet to be detected decreases.

There is known a rotation detection device including two magnetic encoders provided in a concentric ring shape, each having a magnetization array pattern such that magnetic poles are arranged at the circumference, and having different numbers of magnetic poles, and a magnetic sensor detecting a magnetic field of each of the magnetic encoders. In this rotation detection device, a spacer made of a magnetic material is provided between the magnetization array patterns of the two magnetic encoders (see, for example, Patent Document 1).

CITATION LIST

Patent Literature

Patent Document 1: JP 2008-267868 A

SUMMARY OF INVENTION

Technical Problem

In a rotation shaft of an absolute encoder, for example, at a sub-shaft, a bearing is disposed immediately below a magnet attached for angle detection. In the absolute encoder, when the rotation shaft has such a structure, a bearing being a magnetic material acts as a magnetic path, causing a disturbance in the magnetic flux distribution at the angle detection surface side (upper side) of the magnet, such that the detection accuracy of an angle error may deteriorate.

The present invention has been made in view of the above-described problems, and an object of the present invention is to provide an absolute encoder capable of improving the detection accuracy of a rotation angle of the rotation shaft caused by the magnetic flux distribution of the magnet.

Solution to Problem

In order to achieve the above object, an absolute encoder according to the present invention includes: a support shaft having one end fixed to a substrate, and including a flange part at an other end; at least one bearing including an inner ring fixed to the support shaft; a magnetized magnet; a spacer disposed between the bearing and the magnet in an axial direction of the support shaft; a magnet holder configured to hold the magnet; and a magnetic sensor configured to detect a magnetic flux from the magnet, wherein the magnet holder includes a bearing fixing part being a recess part exposed at one side in the axial direction, and fixed to an outer ring of the bearing, and a magnet holding part being a recess part formed at an other end side of the bearing fixing part, the bearing is disposed between the substrate and the flange part in the axial direction, and the spacer is in contact with the outer ring of the bearing from the axial direction inside the bearing fixing part.

In the absolute encoder according to an aspect of the present invention, the substrate includes a hole, the support shaft being insertable into the hole, and the support shaft includes a male screw part at one end, and is fixed to the substrate together with the bearing by inserting the male screw part into the hole.

The absolute encoder according to an aspect of the present invention includes a washer disposed between the substrate and the bearing in the axial direction.

In the absolute encoder according to an aspect of the present invention, the spacer is in contact with the inner peripheral part of the bearing fixing part in a radial direction, and is in contact with the outer ring of the bearing in the axial direction.

In the absolute encoder according to an aspect of the present invention, the flange part has a surface at one end side in the axial direction facing a disk part of the inner ring of the bearing.

In the absolute encoder according to an aspect of the present invention, the spacer is formed in an annular shape, and the flange part is disposed inside an inner peripheral surface of the spacer.

In the absolute encoder according to an aspect of the present invention, the support shaft is formed of a magnetic material.

Advantageous Effects of Invention

The absolute encoder according to the present invention allows improvement of the detection accuracy of a rotation angle of a rotation shaft caused by the magnetic flux distribution of the magnet.

DESCRIPTION OF EMBODIMENTS

Figure 1:
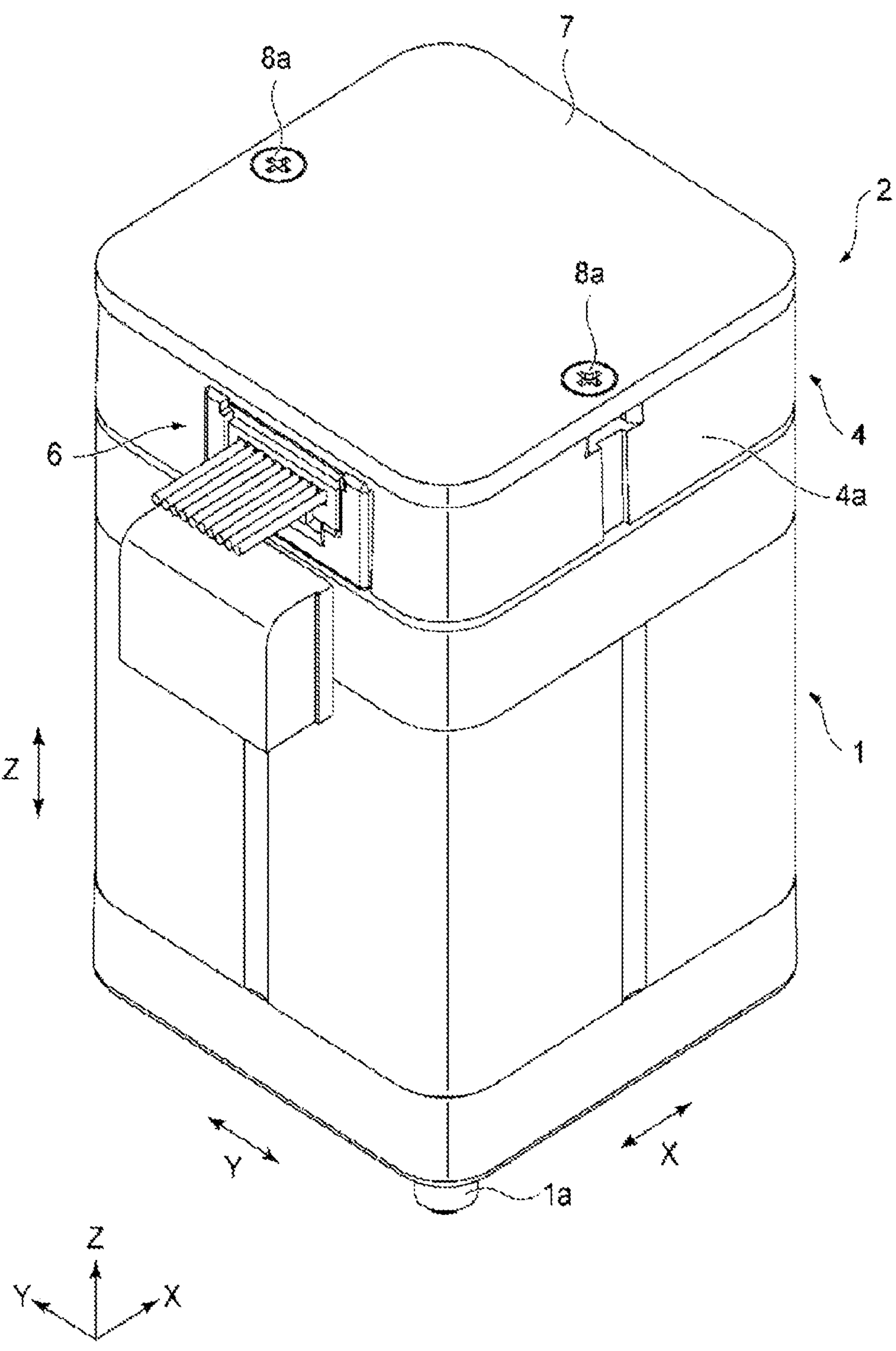
FIG. 1 is a perspective view schematically illustrating a configuration of an absolute encoder according to an embodiment of the present invention.

The present inventors have found that in an absolute encoder, the amount of rotation over multiple rotations (hereinafter, also referred to as a plurality of rotations) of the main shaft (hereinafter, also referred to as the amount of rotation of the main shaft) can be specified by acquiring the rotation angle of a rotating body configured to decelerate and rotate with the rotation of the main shaft. That is, the amount of rotation of the main shaft can be specified by multiplying the rotation angle of the rotating body by a reduction ratio. Here, the range of the specifiable amount of rotation of the main shaft increases in proportion to the reduction ratio. For example, if the reduction ratio is 50, the amount of rotation of the main shaft over 50 rotations can be specified.

On the other hand, the required resolution of the rotating body decreases in proportion to the reduction ratio. For example, if the reduction ratio is 100, the resolution required for the rotating body per rotation of the main shaft is 360°/100=3.6°, and a detection accuracy of ±1.8° is required. On the other hand, when the reduction ratio is 50, the resolution required for the rotating body per rotation of the main shaft is 360°/50=7.2°, and a detection accuracy of ±3.6° is required.

Embodiments of the present invention will be described below with reference to the drawings. In the embodiments and modifications to be described below, the same or equivalent components and members are denoted by the same reference numerals, and duplicate description will be omitted as appropriate. The dimensions of the members in each drawing are enlarged or reduced as appropriate to facilitate understanding. Furthermore, some members not critical in describing embodiments are omitted from the drawings. Also, in the drawings, gears are illustrated without a gear shape. Terms including ordinal numbers such as "first" and "second" are used to describe various components, but these terms are used only for the purpose of distinguishing one component from other components and the components are not limited by these terms. Note that the present invention is not limited by the embodiments described below.

Figure 2:
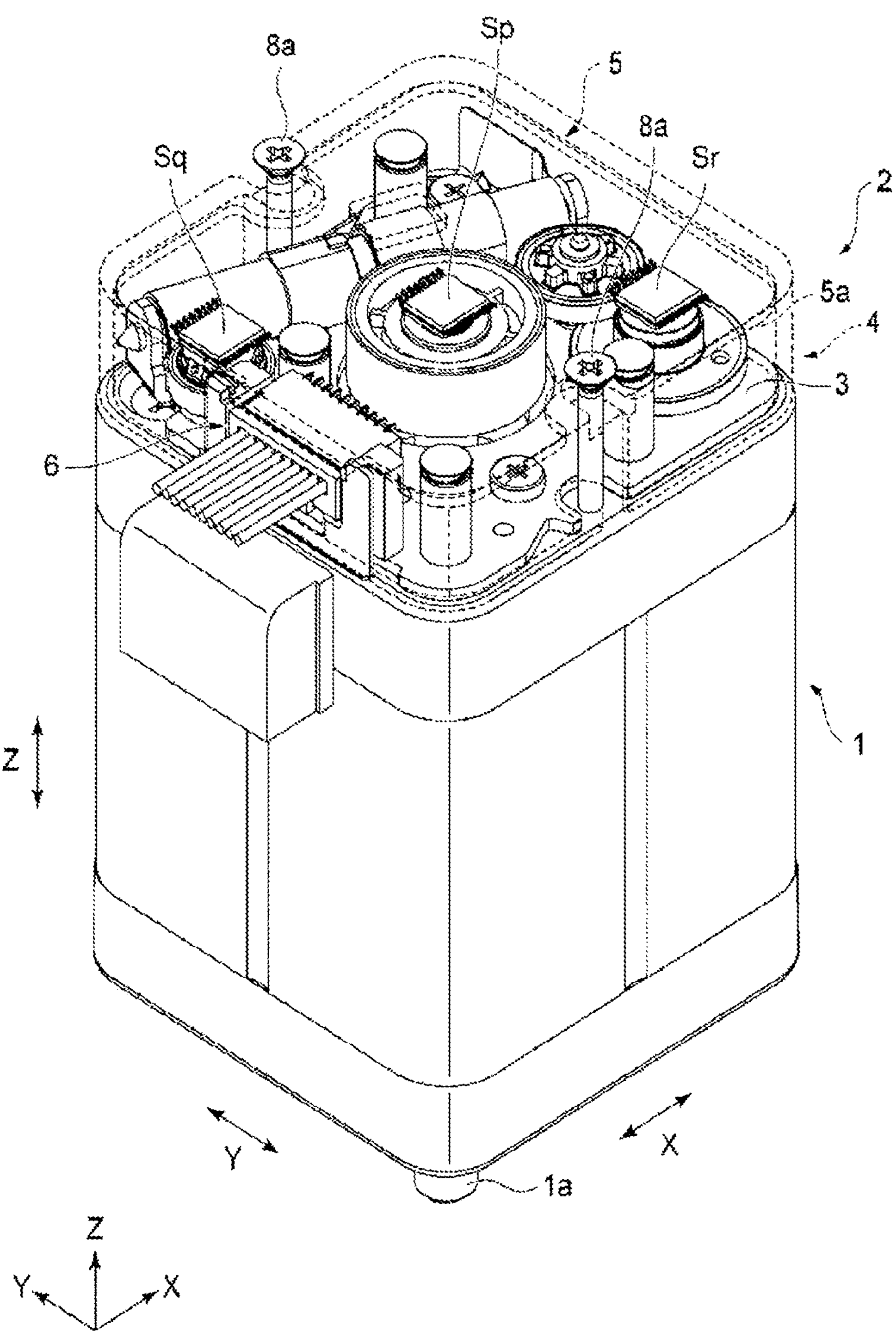
FIG. 2 is a perspective view schematically illustrating the configuration of the absolute encoder illustrated in FIG. 1 with a shield plate removed.
Figure 3:
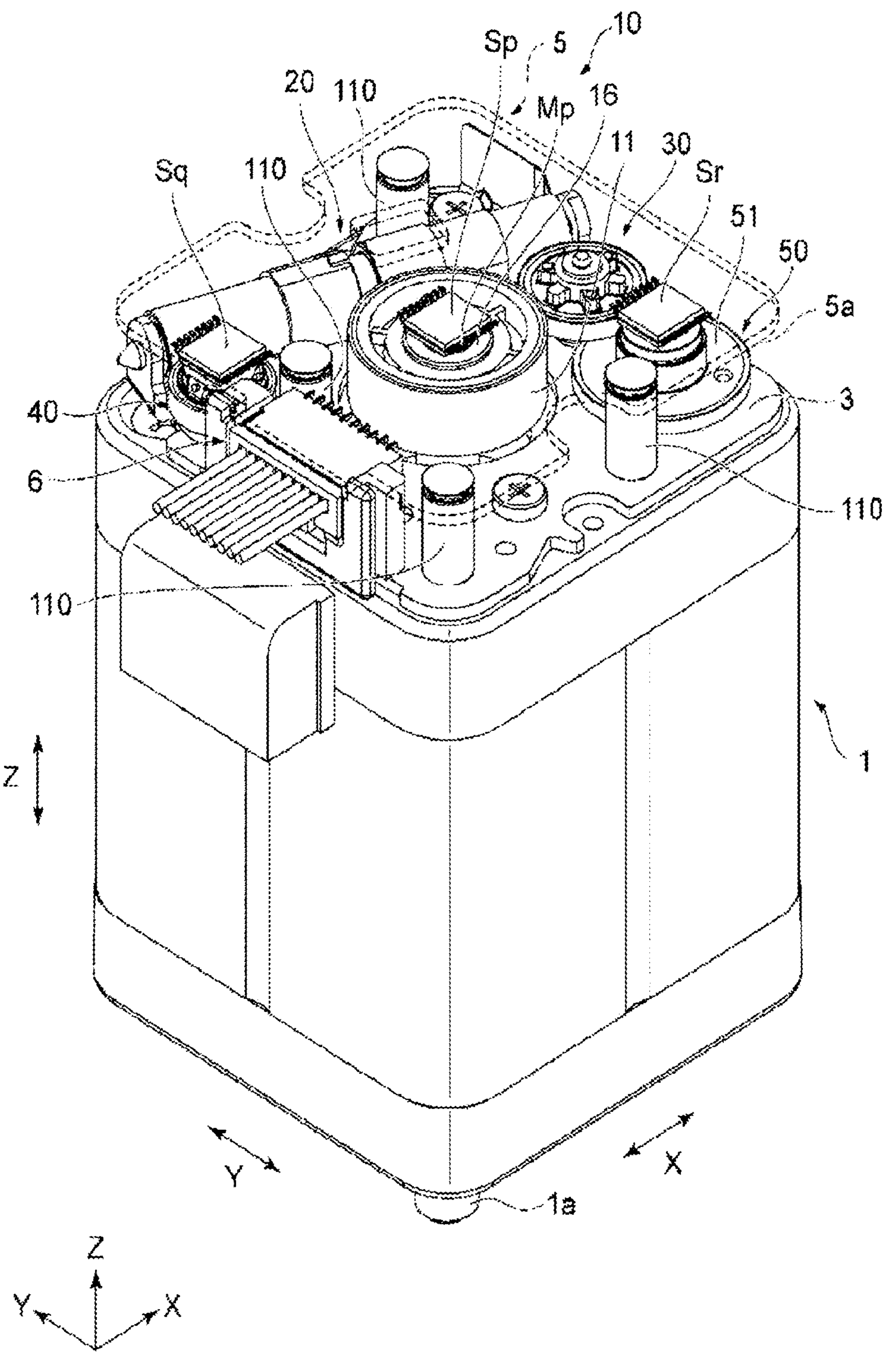
FIG. 3 is a perspective view schematically illustrating the configuration of the absolute encoder illustrated in FIG. 2 with a case removed.
Figure 4:
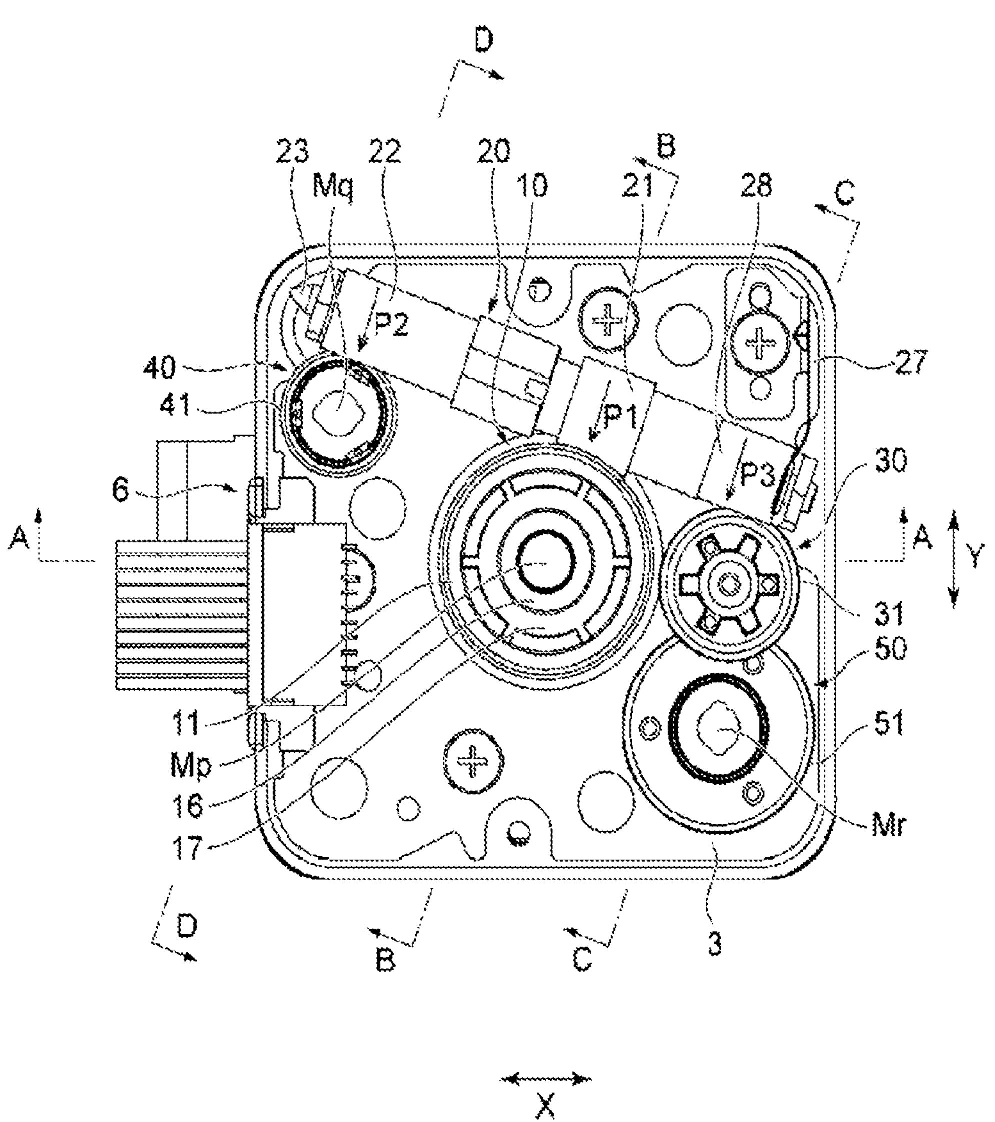
FIG. 4 is a plan view schematically illustrating the configuration of the absolute encoder illustrated in FIG. 3 with a substrate removed.
Figure 5:
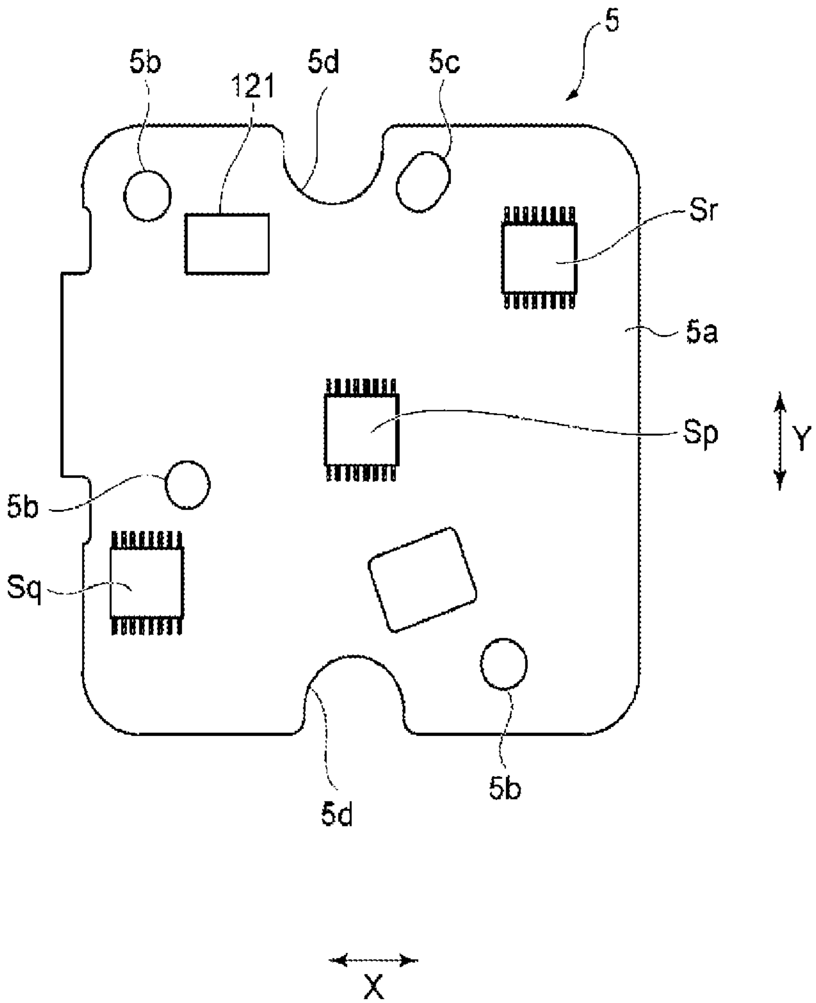
FIG. 5 is a view illustrating an angle sensor support substrate illustrated in FIG. 3 when viewed from a lower surface side.
Figure 6:
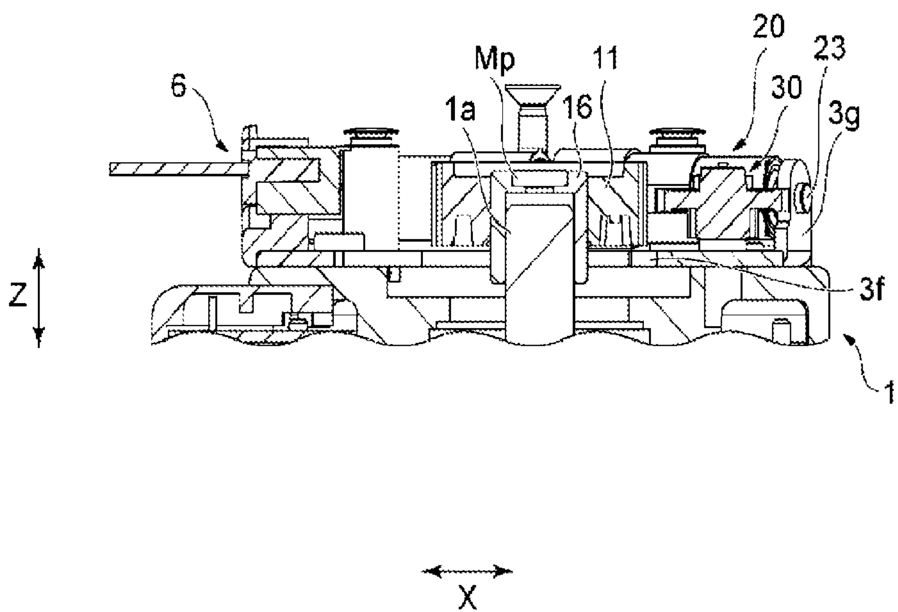
FIG. 6 is a cross-sectional view of the absolute encoder illustrated in FIG. 4 taken along line A-A.
Figure 7:
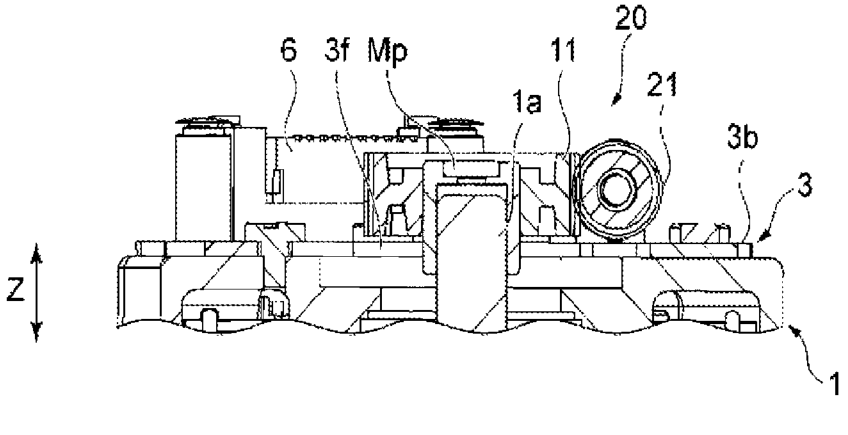
FIG. 7 is a cross-sectional view of the absolute encoder illustrated in FIG. 4 taken along line B-B.
Figure 8:
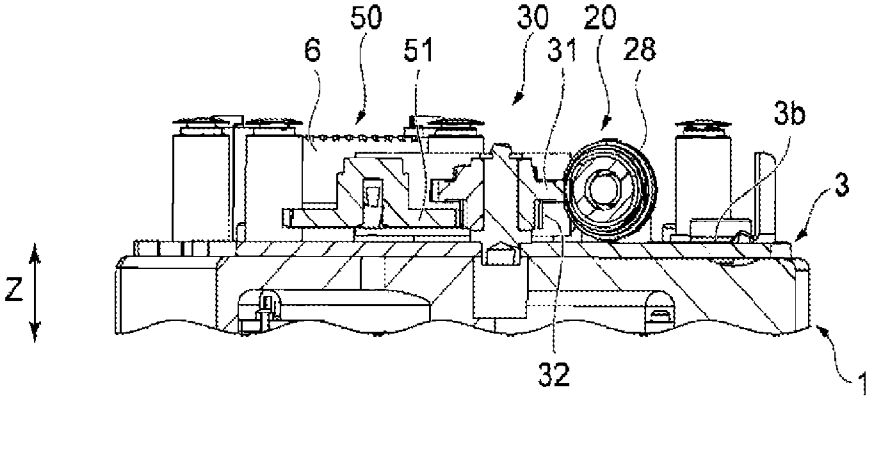
FIG. 8 is a cross-sectional view of the absolute encoder illustrated in FIG. 4 taken along line C-C.
Figure 8:
Figure 9:
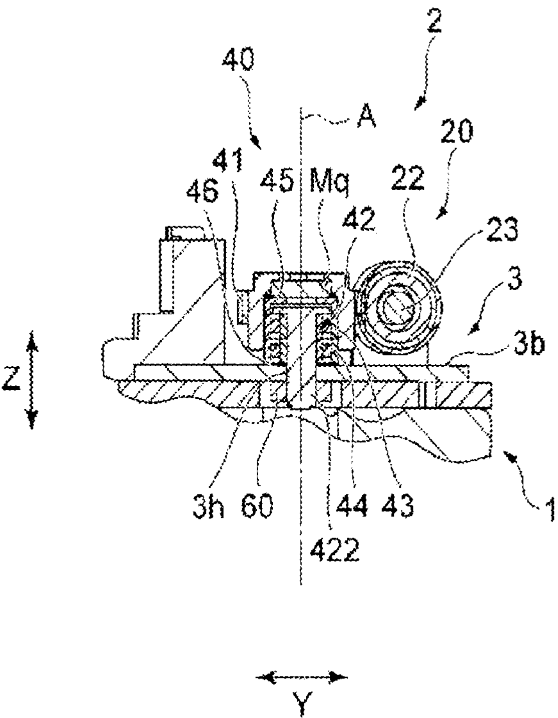
FIG. 9 is a cross-sectional view of the absolute encoder illustrated in FIG. 4 taken along line D-D.

FIG. 1 is a perspective view schematically illustrating the configuration of the absolute encoder 2 according to the embodiment of the present invention. FIG. 2 is a perspective view schematically illustrating the configuration of the absolute encoder 2 with a shield plate 7 removed. In FIG. 2, a case 4 and an angle sensor support substrate 5 of the absolute encoder 2 are transparently illustrated. FIG. 3 is a perspective view schematically illustrating the configuration of the absolute encoder 2 with the case 4 removed. In FIG. 3, the angle sensor support substrate 5 of the absolute encoder 2 is transparently illustrated. FIG. 4 is a plan view schematically illustrating the configuration of the absolute encoder 2 with the angle sensor support substrate 5 removed. FIG. 5 is a diagram of the angle sensor support substrate 5 when viewed from the lower side. FIG. 6 is a cross-sectional view of the absolute encoder 2 taken along line A-A. FIG. 7 is a cross-sectional view of the absolute encoder 2 taken along line B-B. FIG. 8 is a cross-sectional view of the absolute encoder 2 taken along line C-C. FIG. 9 is a cross-sectional view of the absolute encoder 2 taken along line D-D.

As illustrated in FIGS. 1 to 9, the absolute encoder 2 according to the embodiment of the present invention includes a first sub-shaft gear 40, a support shaft 42, a magnet Mq, an angle sensor Sq, a bearing fixing part 411, a magnet holding part 412, a first bearing 43, a second bearing 44, and a spacer 45. The support shaft 42 has one end fixed to a gear base part 3 as a substrate, and includes a flange part 423 at the other end. The magnet Mq is magnetized. The first sub-shaft gear 40 also functions as a magnet holder holding the magnet Mq. The angle sensor Sq functions as a magnetic sensor detecting the magnetic flux from the magnet Mq. The bearing fixing part 411 is provided at the first sub-shaft gear 40. The bearing fixing part 411 is a recess part exposed at one side in the axial direction, and is fixed to the outer ring of the first bearing 43 and the second bearing 44. The magnet holding part 412 is a recess part formed at the other end side of the bearing fixing part 411 in the first sub-shaft gear 40. The first bearing 43 and the second bearing 44, as at least one bearing, have inner rings fixed to the support shaft 42. The first bearing 43 and the second bearing 44 are disposed between the gear base part 3 and the flange part 423 in an axial direction. The spacer 45 is disposed between the first bearing 43 and the second bearing 44, and the magnet Mq, in the axial direction of the support shaft 42. The spacer 45 is in contact with outer rings of the first bearing 43 and the second bearing 44 from the axial direction inside the bearing fixing part 411. Hereinafter, the structure of the absolute encoder 2 will be described in detail.

In the present embodiment, for convenience of explanation, the absolute encoder 2 will be described with reference to an XYZ Cartesian coordinate system. The X-axis direction corresponds to a horizontal left-right direction, the Y-axis direction corresponds to a horizontal front-rear direction, and the Z-axis direction corresponds to a vertical up-down direction. The Y-axis direction and the Z-axis direction are orthogonal to the X-axis direction. In the present description, the X-axis direction is also referred to as the left side or the right side, the Y-axis direction is also referred to as the front side or the rear side, and the Z-axis direction is also referred to as the upper side or the lower side. The absolute encoder 2 illustrated in FIGS. 1 and 2 is orientated such that the left side in the X-axis direction is the left side and the right side in the X-axis direction is the right side. Further, the absolute encoder 2 illustrated in FIGS. 1 and 2 is orientated such that the near side in the Y-axis direction is the front side and the back side in the Y-axis direction is the rear side. Additionally, the absolute encoder 2 illustrated in FIGS. 1 and 2 is orientated such that the upper side in the Z-axis direction is the upper side and the lower side in the Z-axis direction is the lower side. A state when viewed from the upper side in the Z-axis direction is referred to as a plan view, a state when viewed from the front side in the Y-axis direction is referred to as a front view, and a state when viewed from the left side in the X-axis direction is referred to as a side view. The notation for such directions is not intended to limit the usage orientation of the absolute encoder 2, and the absolute encoder 2 may be used in any orientation.

As described above, the absolute encoder 2 is an encoder of an absolute type configured to specify and output the amount of rotation over a plurality of rotations of the main shaft 1*a* of a motor 1 as illustrated in FIGS. 1 and 2. In the embodiment of the present invention, the absolute encoder 2 is provided at an end portion at the upper side in the Z-axis direction of the motor 1. In the embodiment of the present invention, the absolute encoder 2 has a substantially rectangular shape in plan view, and has a rectangular shape being thin and long in the up-down direction being the extension direction of the main shaft 1*a* in front view and side view. That is, the absolute encoder 2 has a flat rectangular parallelepiped shape being longer in the horizontal direction than in the up-down direction.

The absolute encoder 2 includes a hollow and angular tubular case 4 accommodating the internal structure. The case 4 includes a plurality of (for example, four) outer wall parts 4*a* surrounding at least a part of the main shaft 1*a* of the motor 1, a main shaft gear 10, a first intermediate gear 20, a second intermediate gear 30, a first sub-shaft gear 40, a second sub-shaft gear 50, and the like, and has an open upper end portion. In the case 4, the shield plate 7 serving as a magnetic flux shielding member and being a rectangular plate-shaped member is fixed at the case 4 and a gear base part 3 by substrate mounting screws 8*a* at the open upper end portions of the four outer wall parts 4*a*.

The shield plate 7 is a plate-shaped member provided between the angle sensors Sp, Sq, and Sr and the outside of the absolute encoder 2 in the axial direction (Z-axis direction). The shield plate 7 is formed of a magnetic material in order to prevent magnetic interference due to a magnetic flux generated outside the absolute encoder 2 by the angle sensors Sp, Sq, and Sr provided at the inside of the case 4.

The motor 1 may be a stepper motor or a brushless DC motor, for example. As an example, the motor 1 may be a motor employed as a drive source for driving an industrial robot via a reduction mechanism such as strain wave gearing. The main shaft 1*a* of the motor 1 projects from the case of the motor at both sides in the up-down direction. The absolute encoder 2 outputs the amount of rotation of the main shaft 1*a* of the motor 1 as a digital signal.

The motor 1 has a substantially rectangular shape in plan view, and also has a substantially rectangular shape in the up-down direction. That is, the motor 1 has a substantially cuboid shape. In plan view, the four outer wall parts constituting the outer shape of the motor 1 each have a length of 25 mm, for example. In other words, the external shape of the motor 1 is a 25 mm square in plan view. The absolute encoder 2 provided in the motor 1 is, for example, a 25 mm square to match the external shape of the motor 1.

In FIGS. 1 and 2, the angle sensor support substrate 5 is provided to cover the inside of the absolute encoder 2 together with the case 4 and the shield plate 7.

As illustrated in FIG. 5, the angle sensor support substrate 5 has a substantially rectangular shape in plan view and is a thin plate-shaped printed wiring substrate in the vertical direction. Furthermore, a connector 6 is connected to the angle sensor support substrate 5 and is for connecting the absolute encoder 2 and an external device (not illustrated).

As illustrated in FIGS. 2, 3, and 4, the absolute encoder 2 includes the main shaft gear 10 having the first worm gear part 11 (first driving gear), and the first intermediate gear 20 having the first worm wheel part 21 (first driven gear), the second worm gear part 22 (second driving gear), and a third worm gear part 28 (third driving gear). The absolute encoder 2 also includes the second intermediate gear 30 having a third worm wheel part 31 (third driven gear) and a first spur gear part 32 (fourth driving gear), the first sub-shaft gear 40 having the second worm wheel part 41 (second driven gear) and the support shaft 42 (see FIG. 9), and the second sub-shaft gear 50 having a second spur gear part 51 (third driven gear). The absolute encoder 2 also includes a magnet Mp, the angle sensor Sp corresponding to the magnet Mp, the magnet Mq, the angle sensor Sq corresponding to the magnet Mq, a magnet Mr, the angle sensor Sr corresponding to the magnet Mr, and a microcomputer 121.

As illustrated in FIGS. 4 and 6, the main shaft 1*a* of the motor 1 is an output shaft of the motor 1 and is an input shaft configured to transmit a rotational force to the absolute encoder 2. The main shaft gear 10 is fixed to the main shaft 1*a* of the motor 1, and is rotatably supported by a bearing member of the motor 1 integrally with the main shaft 1*a*. The first worm gear part 11 is provided at the outer periphery of the main shaft gear 10 so as to rotate as a first driving gear according to the rotation of the main shaft 1*a* of the motor 1. In the main shaft gear 10, the first worm gear part 11 is provided so that the central axis of the first worm gear part 11 coincides with or substantially coincides with the central axis of the main shaft 1*a*. The main shaft gear 10 can be formed of various materials such as a resin material or a metal material. The main shaft gear 10 is formed of, for example, a polyacetal resin.

As illustrated in FIGS. 3 and 4, the first intermediate gear 20 is a gear part configured to transmit the rotation of the main shaft gear 10 to the first sub-shaft gear 40 and the second intermediate gear 30. The first intermediate gear 20 is axially supported by a shaft 23 around a rotation axial line extending substantially parallel to a base part 3*b*. The first intermediate gear 20 is a substantially cylindrical member extending in the direction of the rotation axial line. The first intermediate gear 20 includes the first worm wheel part 21, the second worm gear part 22, and the third worm gear part 28. A through hole is formed at the inside of the first intermediate gear, and the shaft 23 is inserted into the through hole. The first intermediate gear 20 is axially supported by inserting the shaft 23 into first intermediate gear shaft support parts 3*g* provided at the base part 3*b* of the gear base part 3. The first worm wheel part 21, the second worm gear part 22, and the third worm gear part 28 are disposed at positions separated from each other in this order. The first intermediate gear 20 can be formed of various materials such as a resin material or a metal material. The first intermediate gear 20 is formed of a polyacetal resin.

As illustrated in FIGS. 4 and 7, the first worm wheel part 21 is provided at the outer periphery of the first intermediate gear 20 as a first driven gear. The first worm wheel part 21 is provided to mesh with the first worm gear part 11 and rotate according to the rotation of the first worm gear part 11. The axial angle between the first worm wheel part 21 and the first worm gear part 11 is set to 900 or approximately 90°. That is, the central axis of the first worm wheel part 21 is orthogonal to the central axis of the first worm gear part 11.

Although there is no special restriction on an outer diameter of the first worm wheel part 21, in the illustrated example, the outer diameter of the first worm wheel part 21 is set to be smaller than the outer diameter of the first worm gear part 11, and the outer diameter of the first worm wheel part 21 is small. As a result, the size of the absolute encoder 2 in the up-down direction is reduced.

The second worm gear part 22 is provided at the outer periphery of the first intermediate gear 20 as a second driving gear. The second worm gear part 22 rotates with the rotation of the first worm wheel part 21. The second worm gear part 22 meshes with the second worm wheel part 41 of the first sub-shaft gear 40 to rotate the first sub-shaft gear 40. In the first intermediate gear 20, the second worm gear part 22 is provided so that a central axis of the second worm gear part 22 coincides with or substantially coincides with the central axis of the first worm wheel part 21.

As illustrated in FIGS. 4 and 8, the third worm gear part 28 is provided at the outer periphery of the first intermediate gear 20. The third worm gear part 28 rotates with the rotation of the first worm wheel part 21. The third worm gear part 28 meshes with the third worm wheel part 31 of the second intermediate gear 30 to rotate the second intermediate gear 30. In the first intermediate gear 20, the third worm gear part 28 is provided so that a central axis of the third worm gear part 28 coincides with or substantially coincides with the central axis of the first worm wheel part 21.

As illustrated in FIGS. 4 and 9, the first sub-shaft gear 40 is decelerated according to the rotation of the main shaft **1*a* and rotates integrally with the magnet Mq. The first sub-shaft gear 40 includes the second worm wheel part 41, the support shaft 42, the first bearing 43, the second bearing 44, and the spacer 45. In the first sub-shaft gear 40, the second worm wheel part 41 is axially supported by the support shaft 42 via the first bearing 43 and the second bearing 44**.

Figure 10:
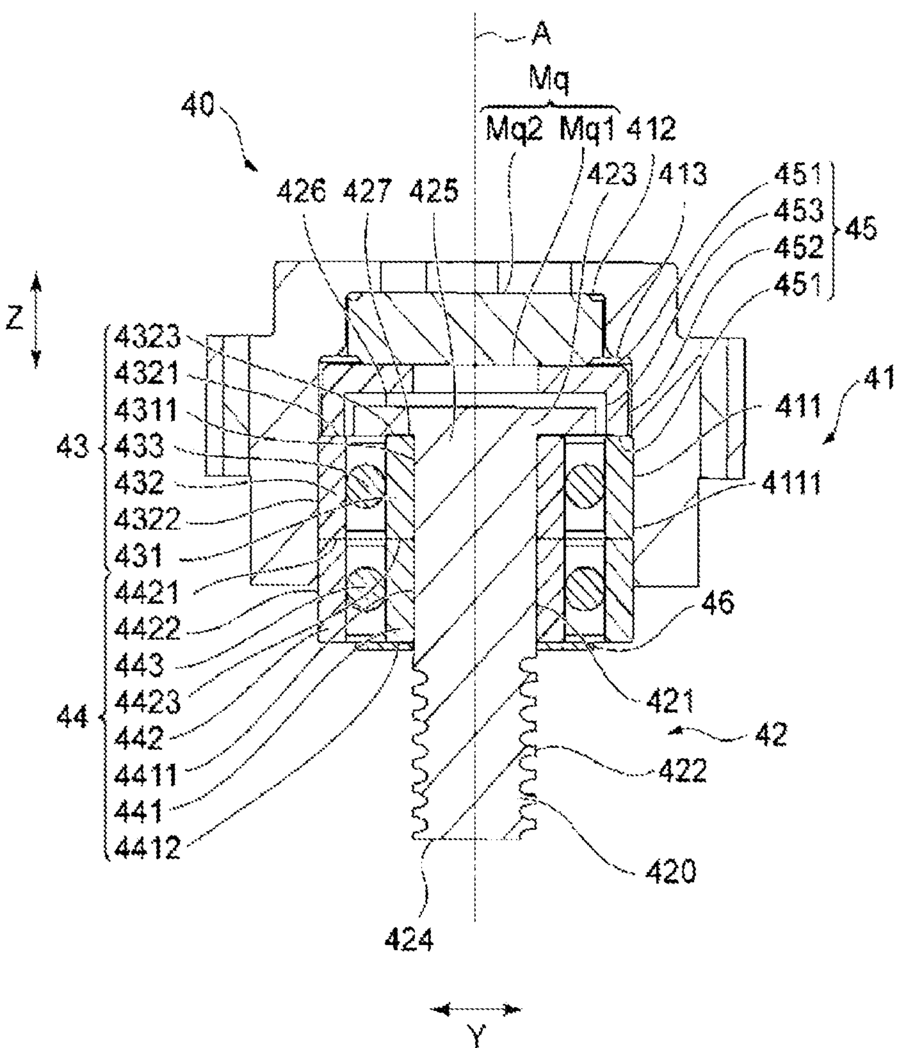
FIG. 10 is a cross-sectional view of a first sub-shaft gear in the absolute encoder illustrated in FIG. 9.

FIG. 10 is a cross-sectional view of the first sub-shaft gear 40 in the absolute encoder 2 taken along line D-D.

As illustrated in FIG. 10, the second worm wheel part 41 is a substantially circular member in plan view. The second worm wheel part 41 can be formed of various materials such as a resin material or a metal material. The second worm wheel part 41 is formed of, for example, polyacetal resin. The second worm wheel part 41 includes the bearing fixing part 411, the magnet holding part 412, and a step part 413.

The second worm wheel part 41 is provided as a second driven gear at an outer periphery of the first sub-shaft gear 40 and is provided to mesh with the second worm gear part 22 and rotate according to the rotation of the second worm gear part 22. An axial angle between the second worm wheel part 41 and the second worm gear part 22 is set to 90° or approximately 90°. That is, the central axis of the second worm wheel part 41 is orthogonal to the central axis of the first worm wheel part 21. A rotation axial line (axial line A) of the second worm wheel part 41 is provided parallel or substantially parallel to a rotation axial line of the first worm gear part 11.

The bearing fixing part 411 is a cylindrical hollow portion provided at a position around the axial line A in the second worm wheel part 41. The bearing fixing part 411 is exposed at one side in the direction along the axial line A, specifically at the lower side in the Z-axis direction in FIGS. 9 and 10. The dimension of an inner peripheral part 4111 of the bearing fixing part 411 in the radial direction (direction perpendicular to the axial line A; the X-axis direction, the Y-axis direction) is set to allow the outer ring of the bearing in the first sub-shaft gear 40 and the second worm wheel part 41 to be fixed. Specifically, the dimension of an inner peripheral part 4111 of the bearing fixing part 411 in the radial direction is set to allow the outer rings 432 and 442 of the first bearing 43 and the second bearing 44 to be press-fitted. The dimension of the bearing fixing part 411 in the direction along the axial line A (Z-axis direction) is set to allow the outer ring 432 of the first bearing 43 and the outer ring 442 of the second bearing 44 to be accommodated in the direction along the axial line A. Further, the bearing fixing part 411 is provided with the step part 413. The step part 413 is an annular surface being parallel to the X-axis and the Y-axis and around the axial line A at the other side in the direction along the axial line A, that is, at the upper side in the Z-axis direction in FIGS. 9 and 10. Note that the second worm wheel part 41 of the first sub-shaft gear 40 does not necessarily include the step part 413 when the diameter of the magnet Mq and the diameter of the first bearing 43 and the second bearing 44 are the same, for example.

Similarly to the bearing fixing part 411, the magnet holding part 412 is an annular hollow portion provided at a position around the axial line A of the second worm wheel part 41. The magnet holding part 412 is formed being capable of accommodating the magnet Mq. The magnet holding part 412 is provided closer to the other side in the direction along the axial line A than the step part 413, that is, at the upper side in the Z-axis direction in FIGS. 9 and 10. The magnet holding part 412 holds the magnet Mq in the hollow portion described above.

The support shaft 42 includes a shaft main body 420, an outer peripheral part 421, a male screw part 422, and the flange part 423. The shaft main body 420 of the support shaft 42 is a shaft-shaped member such that a longitudinal direction is the axial line A direction. In the support shaft 42, the outer peripheral part 421 is, for example, a cylindrical or substantially cylindrical peripheral surface around the axial line A. The male screw part 422 is provided at one end side of the shaft main body 420, that is, at the outer peripheral part 421 within a predetermined range from a lower end portion 424 at the lower side in the Z-axis direction in FIGS. 9 and 10. The flange part 423 is provided at the other end side of the shaft main body 420, that is, at an upper end portion 425 at the upper side in the Z-axis direction in FIGS. 9 and 10. The flange part 423 protrudes radially outward (in the Y-axis direction in FIG. 10) from the surface of the outer peripheral part 421 of the shaft main body 420 at the upper end portion 425. An upper surface (upper surface part 426) and a lower surface (lower surface part 427) of the flange part 423 are flat surfaces in a direction perpendicular to the axial line A direction, that is, in the radial direction (Y-axis direction in FIG. 10).

The support shaft 42 is attached protruding substantially vertically from the base part **3*b* of the gear base part 3. The base part 3*b* of the gear base part 3 has a first sub-shaft gear shaft support part 3*h* as a hole, and the male screw part 422 of the support shaft 42 can be inserted through the hole. The support shaft 42 is fixed to the base part 3*b* of the gear base part 3 together with the first bearing 43 and the second bearing 44 in the following manner. The male screw part 422 of the support shaft 42 is inserted into the first sub-shaft gear shaft support part 3*h* from the upper side to the lower side in the Z-axis direction in a state such that the first bearing 43 and the second bearing 44 are press-fitted. A nut 60 is fastened to the male screw part 422 protruding to the lower side of the base part 3*b*. The support shaft 42 fixed to the base part 3*b* in this manner rotatably supports the second worm wheel part 41 via the first bearing 43 and the second bearing 44**.

The first bearing 43 includes the inner ring 431, the outer ring 432, and rolling elements 433. The inner ring 431 is an annular member having an inner peripheral part 4311 attachable at an outer peripheral part 421 of the support shaft 42. The outer ring 432 is provided at the outer peripheral side of the inner ring 431. The outer ring 432 is an annular member being coaxial with the inner ring 431 and having a larger diameter than the inner ring 431. The rolling elements 433 are a plurality of spherical members disposed between the inner ring 431 and the outer ring 432. The first bearing 43 has the inner ring 431 press-fitted to the outer peripheral part 421 of the support shaft 42. The first bearing 43 has a cylindrical part 4322 of the outer ring 432 press-fitted to the inner peripheral part 4111 of the bearing fixing part 411 of the second worm wheel part 41. The first bearing 43 has a disk part 4321 at the upper side of the outer ring 432 in the direction along the axial line A (Z-axis direction) being in contact with the spacer 45. In addition, in the first bearing 43, the disk part 4323 at the upper side of the inner ring 431 in the direction of the axial line A (Z-axis direction) is in contact with the lower surface part 427 of the flange part 423. In this manner, the first bearing 43 is accurately fixed at the second worm wheel part 41 and the support shaft 42 in the direction along the axial line A and the radial direction.

The second bearing 44 includes the inner ring 441, the outer ring 442, and rolling elements 443. The inner ring 441 is an annular member having an inner peripheral part 4411 attachable at the outer peripheral part 421 of the support shaft 42. The outer ring 442 is provided at the outer peripheral side of the inner ring 441. The outer ring 442 is an annular member being coaxial with the inner ring 441 and having a larger diameter than the inner ring 441. The rolling elements 443 are a plurality of spherical members disposed between the inner ring 441 and the outer ring 442. The second bearing 44 has the inner ring 441 press-fitted to the outer peripheral part 421 of the support shaft 42. The second bearing 44 has a disk part 4421 at the upper side of the outer ring 442 in the direction along the axial line A (Z-axis direction) being in contact with the disk part 4321 at the lower side of the outer ring 432 of the first bearing 43. The second bearing 44 also has a cylindrical part 4422 of the outer ring 442 press-fitted to the inner peripheral part 4111 of the bearing fixing part 411 of the second worm wheel part 41.

The spacer 45 is an annular or substantially annular member having an annular disk part 451 around the axial line A, a cylindrical outer peripheral part 452, and a cylindrical inner peripheral part 453. The spacer 45 is disposed at the inner peripheral part 4111 of the bearing fixing part 411 in the radial direction. One side (lower side in the Z-axis direction) of the spacer 45 in the axial line A direction is in contact with the disk part 4321 of the outer ring 432 of the first bearing 43. The other side (upper side in the Z-axis direction) of the spacer 45 in the axial line A direction is in contact with a disk surface Mq1 at the lower side in the Z-axis direction of the magnet Mq. A disk surface Mq2 of the magnet Mq at the upper side in the Z-axis direction is in contact with the surface of the magnet holding part 412 at the upper side in the Z-axis direction. Therefore, the spacer 45 is in contact with the magnet holding part 412 of the second worm wheel part 41 via the magnet Mq. The flange part 423 of the support shaft 42 is disposed radially inward of the inner peripheral part 453 of the spacer 45.

A washer 46 is disposed between the base part 3*b* and the second bearing 44 in the axial line A direction. The washer 46 has a diameter smaller than a diameter of the outer ring 442 of the second bearing 44. Since the washer 46 having a diameter smaller than a diameter of the outer ring 442 of the second bearing 44 is disposed between the base part 3*b* and the second bearing 44, the outer ring 432 of the first bearing 43 and the outer ring 442 of the second bearing 44 are rotatable with respect to the support shaft 42. That is, in the first sub-shaft gear 40, the second worm wheel part 41 is rotatable with respect to the support shaft 42. The other side (upper side in the Z-axis direction) of the washer 46 in the axial line A direction may be in contact with the disk part 4412 at the lower side in the Z-axis direction of the inner ring 441 of the second bearing 44.

With the above-described configuration, in the absolute encoder 2, the plurality of bearings (first bearing 43 and second bearing 44) included in the first sub-shaft gear 40 are press-fitted and fixed at the bearing fixing part 411. Thus, the first sub-shaft gear 40 is accurately fixed at the support shaft 42 in the direction along the axial line A and the radial direction.

The magnet Mq is a permanent magnet provided on the axial line A of the support shaft 42 at a distal end side of the second worm wheel part 41 (upper side in the Z-axis direction). The magnet Mq is fitted to the inner peripheral part 4111 of the bearing fixing part 411 in the radial direction. The magnet Mq abuts against the spacer 45 and is thereby fixed to the upper side of the bearing fixing part 411 in the axial line A direction. The angle sensor Sq is provided on the axial line A, similarly to the magnet Mq. The angle sensor Sq is provided in the vicinity of the magnet Mq in a range allowing detection of a change in the magnetic flux of the magnet Mq, for example, on the axial line A or in the vicinity of the axial line A. The angle sensor Sq detects a change in the magnetic flux generated from the magnet Mq.

In FIGS. 4 and 8, the second intermediate gear 30 is a disk-shaped gear part configured to rotate according to the rotation of the main shaft 1*a*, decelerate the rotation of the main shaft 1*a*, and transmit the decelerated rotation to the second sub-shaft gear 50. The second intermediate gear 30 is provided between the second worm gear part 22 and the second spur gear part 51 provided at the second sub-shaft gear 50. The second spur gear part 51 meshes with the first spur gear part 32. The second intermediate gear 30 includes the third worm wheel part 31 configured to mesh with the third worm gear part 28 of the first intermediate gear 20, and the first spur gear part 32 configured to drive the second spur gear part 51. The second intermediate gear 30 is formed of, for example, a polyacetal resin. The second intermediate gear 30 is a substantially circular member in plan view. The second intermediate gear 30 is axially supported by the base part 3*b* of the gear base part 3.

The providing of the second intermediate gear 30 enables the second sub-shaft gear 50 to be described below to be disposed at a position away from the third worm gear part 28. Therefore, the distance between the magnets Mp and Mq can be increased to reduce an influence of a leakage flux on the magnets Mp and Mq. Furthermore, the providing of the second intermediate gear 30 enables the expansion of the range allowing the reduction ratio to be set, improving the degree of freedom in design.

The third worm wheel part 31 is provided at an outer periphery of the second intermediate gear 30 and is provided to mesh with the third worm gear part 28 and rotate according to the rotation of the third worm gear part 28. The first spur gear part 32 is provided at the outer periphery of the second intermediate gear 30 so that a central axis of the first spur gear part 32 coincides with or substantially coincides with a central axis of the third worm wheel part 31. The first spur gear part 32 is provided to mesh with the second spur gear part 51 and rotate according to the rotation of the third worm wheel part 31. A rotation axial line of the third worm wheel part 31 and the first spur gear part 32 is provided parallel or substantially parallel to the rotation axial line of the first worm gear part 11.

In FIG. 8, the second sub-shaft gear 50 is a gear part having a circular shape in plan view, rotates according to the rotation of the main shaft 1*a*, decelerates the rotation of the main shaft 1*a*, and transmits the decelerated rotation to the magnet Mr. The second sub-shaft gear 50 is axially supported around a rotation axial line extending substantially vertically from the base part 3*b* of the gear base part 3. The second sub-shaft gear 50 includes the second spur gear part 51 and a magnet holding part configured to hold the magnet Mr.

The second spur gear part 51 is provided at the outer periphery of the second sub-shaft gear 50. The second spur gear part 51 is provided to mesh with the first spur gear part 32 and rotate according to the rotation of the third worm wheel part 31. A rotation axial line of the second spur gear part 51 is provided parallel or substantially parallel to the rotation axial line of the first spur gear part 32. The second sub-shaft gear 50 can be formed of various materials such as a resin material or a metal material. The second sub-shaft gear 50 is formed of a polyacetal resin.

Hereinafter, a direction of the first worm wheel part 21 opposing the first worm gear part 11 to mesh with the first worm gear part 11 is referred to as a first meshing direction P1 (direction of arrow P1 in FIG. 4). Similarly, a direction of the second worm gear part 22 opposing the second worm wheel part 41 to mesh with the second worm wheel part 41 is referred to as a second meshing direction P2 (direction of arrow P2 in FIG. 4). Moreover, a direction of the third worm gear part 28 opposing the third worm wheel part 31 to mesh with the third worm wheel part 31 is referred to as a third meshing direction P3 (direction of arrow P3 in FIG. 4). In the present embodiment, the first meshing direction P1, the second meshing direction P2, and the third meshing direction P3 are all directions along a horizontal plane (XY plane).

The magnet Mp is fixed to an upper surface of the main shaft gear 10 such that the central axes of both the magnet Mp and the main shaft gear 10 coincide or substantially coincide with each other. The magnet Mp is supported by a magnet support part 17 provided at a central axis of the main shaft gear 10 via a holder part 16. The holder part 16 is formed of a non-magnetic material such as an aluminum alloy. An inner peripheral surface of the holder part 16 is formed, for example, in an annular shape corresponding to an outer diameter of the magnet Mp and the shape of an outer peripheral surface of the magnet Mp so as to be in contact with the outer peripheral surface of the magnet Mp in a radial direction and to hold the outer peripheral surface. Furthermore, an inner peripheral surface of the magnet support part 17 is formed, for example, in an annular shape corresponding to an outer diameter of the holder part 16 and the shape of an outer peripheral surface of the holder part 16 so as to be in contact with the outer peripheral surface of the holder part 16. The magnet Mp has two magnetic poles arranged in a direction perpendicular to a rotation axial line of the main shaft gear 10. In order to detect a rotation angle of the main shaft gear 10, the angle sensor Sp is provided at a lower surface 5*a* of the angle sensor support substrate 5 so that a lower surface of the angle sensor Sp opposes the upper surface of the magnet Mp in the vertical direction via a gap.

As an example, the angle sensor Sp is fixed at the angle sensor support substrate 5 supported by a substrate post 110 disposed at the gear base part 3 to be described below in the absolute encoder 2. The angle sensor Sp detects the magnetic pole of the magnet Mp, and outputs detection information to the microcomputer 121. The microcomputer 121 specifies the rotation angle of the main shaft gear 10, that is, a rotation angle of the main shaft 1*a*, by specifying a rotation angle of the magnet Mp on the basis of the received magnetic pole-related detection information. The resolution of the rotation angle of the main shaft 1*a* corresponds to the resolution of the angle sensor Sp. As will be described below, the microcomputer 121 specifies the amount of rotation of the main shaft 1*a* on the basis of a specified rotation angle of the first sub-shaft gear 40 and the specified rotation angle of the main shaft 1*a*, and outputs the specified amount of rotation. As an example, the microcomputer 121 may output the amount of rotation of the main shaft 1*a* of the motor 1 as a digital signal.

The angle sensor Sq detects the rotation angle of the second worm wheel part 41, that is, the rotation angle of the first sub-shaft gear 40. The magnet Mq is fixed at an upper surface of the first sub-shaft gear 40 such that the central axes of both the magnet Mq and the first sub-shaft gear 40 coincide or substantially coincide with each other. The magnet Mq has two magnetic poles arranged in a direction perpendicular to a rotation axial line of the first sub-shaft gear 40. As illustrated in FIG. 3, in order to detect the rotation angle of the first sub-shaft gear 40, the angle sensor Sq is provided so that a lower surface of the angle sensor Sq opposes an upper surface of the magnet Mq in the vertical direction via a gap.

As an example, the angle sensor Sq is fixed at the angle sensor support substrate 5 at the same surface as the surface where the angle sensor Sp is fixed, the angle sensor Sp being fixed at the angle sensor support substrate 5. The angle sensor Sq detects the magnetic pole of the magnet Mq, and outputs detection information to the microcomputer 121. The microcomputer 121 specifies a rotation angle of the magnet Mq, that is, the rotation angle of the first sub-shaft gear 40, on the basis of the received magnetic pole-related detection information.

The angle sensor Sr detects a rotation angle of the second spur gear part 51, that is, a rotation angle of the second sub-shaft gear 50. The magnet Mr is fixed at an upper surface of the second sub-axis gear 50 such that the central axes of both the magnet Mr and the second sub-shaft gear 50 coincide or substantially coincide with each other. The magnet Mr has two magnetic poles arranged in a direction perpendicular to a rotation axial line of the second sub-shaft gear 50. As illustrated in FIG. 3, in order to detect the rotation angle of the second sub-shaft gear 50, the angle sensor Sr is provided so that a lower surface of the angle sensor Sr opposes an upper surface of the magnet Mr in the vertical direction via a gap.

As an example, the angle sensor Sr is fixed at the angle sensor support substrate 5 supported by the substrate post 110 disposed at the gear base part 3 to be described below in the absolute encoder 2. The angle sensor Sr detects the magnetic pole of the magnet Mr, and outputs detection information to the microcomputer 121. The microcomputer 121 specifies a rotation angle of the magnet Mr, that is, the rotation angle of the second sub-shaft gear 50, on the basis of the received magnetic pole-related detection information.

A magnetic angle sensor having a relatively high resolution may be used for each magnetic sensor. The magnetic angle sensor is disposed opposing an end face including magnetic poles of each permanent magnet in the axial direction of each rotating body via a certain gap, specifies a rotation angle of an opposing rotating body on the basis of the rotation of these magnetic poles, and outputs a digital signal. Examples of the magnetic angle sensor include a detection element configured to detect a magnetic pole and an arithmetic circuit configured to output a digital signal on the basis of the output of the detection element. The detection element may include, for example, a plurality of (for example, four) magnetic field detection elements such as a Hall element or a giant magneto-resistive (GMR) element.

The arithmetic circuit may specify, for example, a rotation angle by table processing using a look-up table using, as a key, the difference or ratio of the outputs of the plurality of detection elements. The detection element and the arithmetic circuit may be integrated on one IC chip. This IC chip may be embedded in a resin having a thin rectangular parallelepiped outer shape. Each magnetic sensor outputs an angle signal to the microcomputer 121 as a digital signal corresponding to the rotation angle of each rotating body detected via a wiring member (not illustrated). For example, each magnetic sensor outputs the rotation angle of each rotating body as a digital signal of multiple bits (for example, 7 bits).

Figure 11:
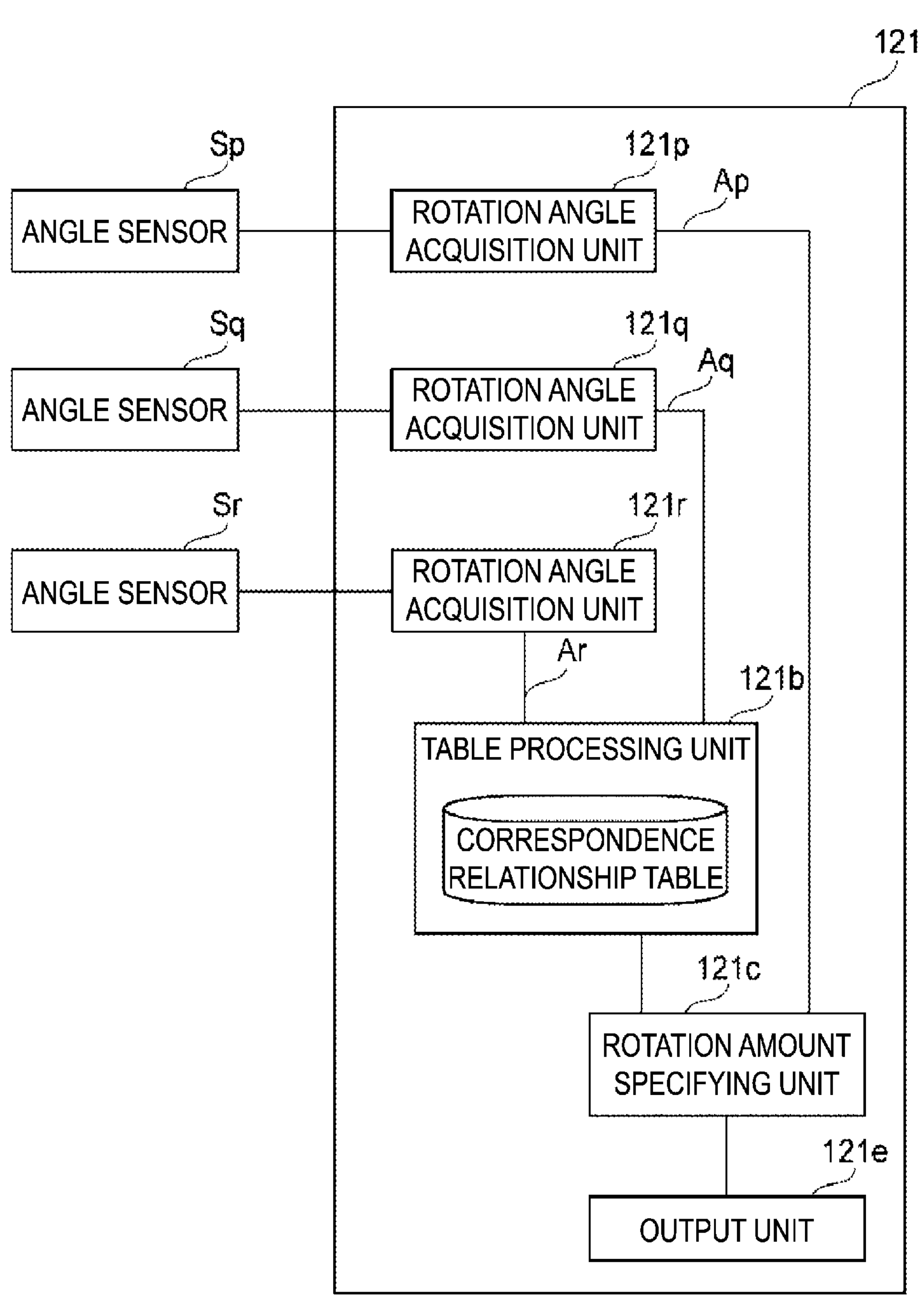
FIG. 11 is a block diagram schematically illustrating a functional configuration of the absolute encoder illustrated in FIG. 1.

FIG. 11 is a block diagram schematically illustrating a functional configuration of the absolute encoder. As illustrated in FIG. 11, the microcomputer 121 is fixed at a surface of the angle sensor support substrate 5 at the base part 3*b* side of the gear base part 3, by a method such as soldering or bonding. The microcomputer 121 includes a CPU, acquires the digital signal output from each of the angle sensors Sp, Sq, and Sr and representing the rotation angle, and calculates the amount of rotation of the main shaft gear 10. Each block of the microcomputer 121 illustrated in FIG. 11 represents a function implemented by the CPU as the microcomputer 121 executing a program. Each block of the microcomputer 121 can be implemented by an element or a mechanical device such as a central processing unit (CPU) or a random access memory (RAM) of a computer, in terms of hardware, and is implemented by a computer program or the like in terms of software, but in the present specification, function blocks implemented by cooperation of hardware and software are drawn. Accordingly, it is understood by those skilled in the art who have read the present specification that these functional blocks can be implemented in various forms by combining hardware and software.

The microcomputer 121 includes a rotation angle acquisition unit 121*p*, a rotation angle acquisition unit 121*q*, a rotation angle acquisition unit 121*r*, a table processing unit 121*b*, a rotation amount specifying unit 121*c*, and an output unit 121*e*. The rotation angle acquisition unit 121*p* acquires a rotation angle Ap as angle information indicating the rotation angle of the main shaft gear 10, that is, the main shaft 1*a*, on the basis of a signal output from the angle sensor Sp. The rotation angle acquisition unit 121*q* acquires a rotation angle Aq as angle information indicating the rotation angle of the first sub-shaft gear 40 on the basis of a signal output from the angle sensor Sq. The rotation angle acquisition unit 121*r* acquires a rotation angle Ar as angle information indicating the rotation angle of the second sub-shaft gear 50 detected by the angle sensor Sr.

The table processing unit 121*b* refers to a first correspondence relationship table with the rotation angle Ap and the number of rotations of the main shaft gear 10 corresponding to the rotation angle Ap stored and specifies the number of rotations of the main shaft gear 10 corresponding to the acquired rotation angle Ap. Furthermore, the table processing unit 121*b* refers to a second correspondence relationship table with the rotation angle Ar and the number of rotations of the main shaft gear 10 corresponding to the rotation angle Ar stored, and specifies the number of rotations of the main shaft gear 10 corresponding to the acquired rotation angle Ar.

The rotation amount specifying unit 121*c* specifies a first amount of rotation over a plurality of rotations of the main shaft gear 10 according to the number of rotations of the main shaft gear 10 specified by the table processing unit 121*b* and the acquired rotation angle Aq. The output unit 121*e* converts the amount of rotation of the main shaft gear 10 specified by the rotation amount specifying unit 121*c* over the plurality of rotations into information indicating the amount of rotation, and outputs the information.

The table processing unit 121*b*, the rotation amount specifying unit 121*c*, and the output unit 121*e* also function as an angle position information output unit configured to output angle position information of the first worm gear part 11 to an external control device (controller). Furthermore, the table processing unit 121*b*, the rotation amount specifying unit 121*c*, and the output unit 121*e* also output angle error information for correcting the angle position information of the first worm gear part 11 to the external control device.

The absolute encoder 2 configured in this way can specify the number of rotations of the main shaft 1*a* according to the rotation angles of the first sub-shaft gear 40 and the second sub-shaft gear 50 specified on the basis of the detection information of the angle sensors Sq and Sr, and specify the rotation angle of the main shaft 1*a* on the basis of the detection information of the angle sensor Sp. Then, the microcomputer 121 specifies the amount of rotation of the main shaft 1*a* over multiple rotations on the basis of the specified number of rotations of the main shaft 1*a* and the specified rotation angle of the main shaft 1*a*.

The number of rows of the first worm gear part 11 of the main shaft gear 10 provided at the main shaft 1*a* is, for example, 1, and the number of teeth of the first worm wheel part 21 is, for example, 20. That is, the first worm gear part 11 and the first worm wheel part 21 constitute a first transmission mechanism having a reduction ratio of 20 (=20/1) (see FIG. 4). When the first worm gear part 11 rotates 20 times, the first worm wheel part 21 rotates once. Since the first worm wheel part 21 and the second worm gear part 22 are provided coaxially to form the first intermediate gear 20 and rotate integrally, when the first worm gear part 11 rotates 20 times, that is, when the main shaft 1*a* and the main shaft gear 10 rotate 20 times, the first intermediate gear 20 rotates once and the second worm gear part 22 rotates once.

The number of rows of the second worm gear part 22 is, for example, 5, and the number of teeth of the second worm wheel part 41 is, for example, 25. That is, the second worm gear part 22 and the second worm wheel part 41 constitute a second transmission mechanism having a reduction ratio of 5 (=25/5) (see FIG. 4). When the second worm gear part 22 rotates five times, the second worm wheel part 41 rotates once. Since the first sub-shaft gear 40 formed by the second worm wheel part 41 rotates integrally with the magnet Mq, when the second worm gear part 22 constituting the first intermediate gear 20 rotates five times, the magnet Mq rotates once. From the above, when the main shaft 1*a* rotates 100 times, the first intermediate gear 20 rotates five times and the first sub-shaft gear 40 and the magnet Mq rotate once. That is, the number of rotations for 50 rotations of the main shaft 1*a* can be specified by detection information of the angle sensor Sq regarding the rotation angle of the first sub-shaft gear 40.

The number of rows of the third worm gear part 28 is, for example, 1, and the number of teeth of the third worm wheel part 31 is, for example, 30. That is, the third worm gear part 28 and the third worm wheel part 31 constitute a third transmission mechanism having a reduction ratio of 30 (=30/1) (see FIG. 4). When the third worm gear part 28 rotates 30 times, the third worm wheel part 31 rotates once. The second intermediate gear 30 formed by the third worm wheel part 31 is provided with the first spur gear part 32 having the central axis coinciding with or substantially coinciding with the central axis of the third worm wheel part 31. Therefore, when the third worm wheel part 31 rotates, the first spur gear part 32 also rotates. Since the first spur gear part 32 meshes with the second spur gear part 51 provided at the second sub-shaft gear 50, when the second intermediate gear 30 rotates, the second sub-shaft gear 50 also rotates.

The number of teeth of the second spur gear part 51 is, for example, 40, and the number of teeth of the first spur gear part 32 is, for example, 24. That is, the first spur gear part 32 and the second spur gear part 51 constitute a fourth transmission mechanism having a reduction ratio of 5/3 (=40/24) (see FIG. 4). When the first spur gear part 32 rotates five times, the second spur gear part 51 rotates three times. Since the second sub-shaft gear 50 formed by the second spur gear part 51 rotates integrally with the magnet Mr as will be described below, when the third worm gear part 28 constituting the first intermediate gear 20 rotates five times, the magnet Mr rotates once. From the above, when the main shaft 1*a* rotates 1,000 times, the first intermediate gear 20 rotates 50 times, the second intermediate gear 30 rotates 5/3 times, and the second sub-shaft gear 50 and the magnet Mr rotate once. That is, the number of rotations for 1,000 rotations of the main shaft 1*a* can be specified by detection information of the angle sensor Sr regarding the rotation angle of the second sub-shaft gear 50.

Operation of Absolute Encoder

Hereinafter, the operation of the absolute encoder 2 is described.

As described above (see FIGS. 1 to 11), the first sub-shaft gear 40 of the absolute encoder 2 includes the second worm wheel part 41 as a second driven gear, the support shaft 42, the first bearing 43, the second bearing 44, and the spacer 45. In the support shaft 42, the male screw part 422 is fixed to the first sub-shaft gear shaft support part 3*h* of the gear base part 3 by the nut 60. The support shaft 42 has the flange part 423 at the upper end portion 425. The first bearing 43 and the second bearing 44 are disposed between the gear base part 3 and the flange part 423 in an axial direction. The outer ring 432 of the first bearing 43 and the outer ring 442 of the second bearing 44 are fixed to the bearing fixing part 411 of the first sub-shaft gear 40. The magnet Mq is held by the magnet holding part 412 of the first sub-shaft gear 40. The spacer 45 is disposed between the magnet Mq and the first bearing 43 and the second bearing 44 in the direction of the axial line A. The flange part 423 of the support shaft 42 is disposed radially inward of the inner peripheral part 453 of the spacer 45. The uprighting of the support shaft 42 of the first sub-shaft gear 40 is obtained as follows. To be more specific, at the lower side of the first sub-shaft gear 40 in the direction of the axial line A, the lower disk part 4423 of the inner ring 441 of the second bearing 44 in the direction of the axial line A is in contact with the base part 3*b* of the gear base part 3 via the washer 46. At the upper side of the first sub-shaft gear 40 in the axial direction, the disk part 4323 at the upper side in the axial line A direction of the inner ring 431 of the first bearing 43 press-fitted to the support shaft 42 is in contact with the lower surface part 427 of the flange part 423. Further, the support shaft 42 is inserted into the first sub-shaft gear shaft support part 3*h*, and is fixed to the base part 3*b* by fastening the nut 60 to the male screw part 422. In this state, the force acting on the support shaft 42 due to fastening of the nut 60 acts on the upper disk part 4323 of the inner ring 431 of the first bearing 43. As described above, in the first sub-shaft gear 40, the flange part 423 provided at the upper end portion 425 of the support shaft 42 and the first bearing 43 and the second bearing 44 press-fitted to the support shaft 42 are positioned, whereby the uprighting of the support shaft 42 is obtained.

With the configuration described above, in the absolute encoder 2, since the uprighting of the support shaft 42 is obtained as described above, it is not necessary to provide a shaft support structure such as a flange (not illustrated) for obtaining the uprighting at the lower side of the support shaft 42 in the axial line A direction. Therefore, according to the absolute encoder 2, it is possible to sufficiently ensure the thickness of the spacer 45 in the up-down direction (axial line A direction) while suppressing an increase in the height of the first sub-shaft gear 40 as a whole in the up-down direction. According to the absolute encoder 2, since the thickness of the spacer 45 in the up-down direction can be sufficiently secured, the distance in the axial line A direction between the magnet Mq and the first bearing 43 and the second bearing 44 being magnetic materials is increased. Therefore, according to the absolute encoder 2, it is possible to reduce the influence of the first bearing 43 and the second bearing 44 becoming magnetic paths. To be specific, in the absolute encoder 2, the distribution of the surface magnetic flux density at the angle detection surface side of the magnet Mq is stabilized, and thus it is possible to improve the detection accuracy of the angle information of the first sub-shaft gear 40 used for the determination of the plurality of rotation amounts of the main shaft 1*a*. As a result, according to the absolute encoder 2, it is possible to obtain an effect of improving on poor determination of the plurality of rotation amounts. Thus, with the absolute encoder 2, errors in the detection of the rotation angle can be suppressed.

An embodiment of the present invention has been described above, but the present invention is not limited to the absolute encoder 2 according to the embodiment of the present invention described above, and includes various aspects included in the gist of the present invention and the scope of the claims. Further, configurations may be combined with each other or combined with known technology as appropriate to at least partially address the problem described above and achieve the effects described above. For example, a shape, a material, an arrangement, a size, and the like of each of the components in the embodiment described above may be changed as appropriate according to a specific usage aspect of the present invention.

For example, in the absolute encoder 2, the configuration of the first sub-shaft gear 40 described above may be combined with the second sub-shaft gear 50 to suppress the vibration of the second sub-shaft gear 50 and improve the detection accuracy of the rotation angle of the sub-shaft.

For example, in the absolute encoder 2, the number of bearings included in the first sub-shaft gear 40 described above is not limited to two, that is, the first bearing 43 and the second bearing 44, and may be three or more. In this case, at least one bearing having an outer ring press-fitted has an outer ring press-fitted to the first sub-shaft gear 40.

For example, in the absolute encoder 2, the shape of the spacer 45 included in the first sub-shaft gear 40 has a shape such that the spacer 45 is in contact with the outer ring 432 of the first bearing 43. In other words, the shape of the spacer 45 has a configuration such that the inner ring 431 and the support shaft 42 do not contact the magnet Mq or the spacer 45. For this reason, the shape of the spacer 45 is not limited to the above-described annular shape, and for example, the spacer 45 may be formed in a disk shape, and the spacer 45 may in a part have a recessed part.

For example, in the support shaft 42 of the absolute encoder 2, the material of the support shaft 42 may be a magnetic material. By using a magnetic material as the material of the support shaft 42, the flange part 423 extending radially outward (in a direction perpendicular to the axial line A direction) from the shaft main body 420 can form a magnetic path for the magnetic flux from the magnet Mq. That is, the support shaft 42 formed of a magnetic material can prevent the first bearing 43 and the second bearing 44 from serving as magnetic paths by the flange part 423 functioning as a magnetic shield of the magnetic flux from the magnet Mq toward the first bearing 43 and the second bearing 44. Therefore, by forming the support shaft 42 from a magnetic material, it is possible to suppress the occurrence of a disturbance in the magnetic flux distribution at the angle detection surface side (upper side) of the magnet Mq and improve the detection accuracy of an angle error.

REFERENCE SIGNS LIST

1 Motor, 1*a* Main shaft, 1*b* Press-fitting part, 2 Absolute encoder, 3 Gear base part, 3*b* Base part, 3*g* First intermediate gear shaft support part, 3*h* First sub-shaft gear shaft support part, 4 Case, 4*a* Outer wall part, 5 Angle sensor support substrate, 5*a* Lower surface, 6 Connector, 7 Shield plate, 8*a* Substrate mounting screw, 10 Main shaft gear, 11 First worm gear part, 16 Holder part, 17 Magnet support part, 20 First intermediate gear, 21 First worm wheel part, 22 Second worm gear part, 23 Shaft, 28 Third worm gear part, 30 Second intermediate gear, 31 Third worm wheel part, 32 First spur gear part, 40 First sub-shaft gear, 41 Second worm wheel part, 42 Support shaft, 43 First bearing, 44 Second bearing, 45 Spacer, 46 Washer, 50 Second sub-shaft gear, 51 Second spur gear part, 60 Nut, 110 Substrate post, 121 Microcomputer, 121*b* Table processing unit, 121*c* Rotation amount specifying unit, 121*e* Output unit, 121*p* Rotation angle acquisition unit, 121*q* Rotation angle acquisition unit, 121*r* Rotation angle acquisition unit, 411 Bearing fixing part, 412 Magnet holding part, 413 Step part, 420 Shaft main body, 421 Outer peripheral part, 422 Male screw part, 423 Flange part, 424 Lower end portion, 425 Upper end portion, 426 Upper surface part, 427 Lower surface part, 431 Inner ring, 432 Outer ring, 433 Rolling element, 441 Inner ring, 442 Outer ring, 443 Rolling element, 451 Disk part, 452 Outer peripheral part, 453 Inner peripheral part, 4111 Inner peripheral part, 4311 Inner peripheral part, 4321, 4323 Disk part, 4322 Cylindrical part, 4411 Inner peripheral part, 4412, 4421, 4423 Disk part, 4422 Cylindrical part, Sp Angle sensor, Sq Angle sensor, Sr Angle sensor

The invention claimed is:

1. An absolute encoder comprising:

a support shaft having one end fixed to a substrate, and including a flange part at an other end, the support shaft being formed of a magnetic material;

at least one bearing including an inner ring fixed to the support shaft;

a magnetized magnet;

a spacer disposed between the bearing and the magnet in an axial direction of the support shaft;

a magnet holder configured to hold the magnet;

a washer disposed between the substrate and the bearing in the axial direction; and a magnetic sensor configured to detect a magnetic flux from the magnet, wherein the magnet holder includes:

a bearing fixing part being a recess part exposed at one side in the axial direction, and fixed to an outer ring of the bearing, and a magnet holding part being a recess part formed at an other end side of the bearing fixing part, the bearing is disposed between the substrate and the flange part in the axial direction, the spacer is in contact with the outer ring of the bearing from the axial direction inside the bearing fixing part, the substrate includes a hole, the support shaft being insertable into the hole and a nut disposed in the hole, and the support shaft includes a male screw part at the one end, and the support shaft is fixed to the substrate together with the bearing by screwing the male screw part into the hole and the nut.

2. The absolute encoder according to claim 1, wherein the spacer is in contact with the inner peripheral part of the bearing fixing part in a radial direction, and is in contact with the outer ring of the bearing in the axial direction.

3. The absolute encoder according to claim 1, wherein the flange part has a surface at one end side in the axial direction facing a disk part of the inner ring of the bearing.

4. The absolute encoder according to claim 1, wherein the spacer is formed in an annular shape, and the flange part is disposed inside an inner peripheral surface.

* * * * *